United States Patent [19]

Strahsner et al.

[11] 4,145,197

[45] Mar. 20, 1979

[54] IMPELLER FOR SEPARATING DUST PARTICLES FROM AN AIR STREAM

[75] Inventors: Emanuel Strahsner, Zeltweg; Peter Kogler, Knittelfeld; Alfred J. Zitz, Zeltweg, all of Austria

[73] Assignee: Vereinigte Osterreichische Eisen- und Stahlwerke-Alpine Montan Aktiengesellschaft, Vienna, Austria

[21] Appl. No.: 794,024

[22] Filed: May 5, 1977

[51] Int. Cl.² ............................................. B01D 47/00
[52] U.S. Cl. ....................................... 55/401; 55/403; 55/230; 55/406; 55/257 C; 55/416
[58] Field of Search ................................. 55/406–409, 55/401, 403, 257 R, 416, 257 C

[56] References Cited

U.S. PATENT DOCUMENTS

| 3,276,189 | 10/1966 | Sylvan | 55/230 |
| 3,820,307 | 6/1974 | Hausberg et al. | 55/257 C |

FOREIGN PATENT DOCUMENTS

| 63043 | 6/1948 | Norway | 55/407 |
| 582480 | 11/1946 | United Kingdom | 55/407 |

*Primary Examiner*—Bernard Nozick
*Attorney, Agent, or Firm*—Cushman, Darby & Cushman

[57] ABSTRACT

A device for separating dust particles from an air stream, in particular for mine ventilation, comprising a centrifugal separator, a blower for conveying the air stream through the centrifugal separator, and a device connected in advance of the centrifugal separator in the air flow direction to spray or atomize water which is fed into the air stream entering the centrifugal separator, the centrifugal separator being formed from at least one impeller with substantially radial blades connected together at their outer ends by circumferentially extending walls, the distance of which from the axis increases in the air flow direction, passage apertures being provided to the housing at the positions of greatest diameter.

10 Claims, 5 Drawing Figures

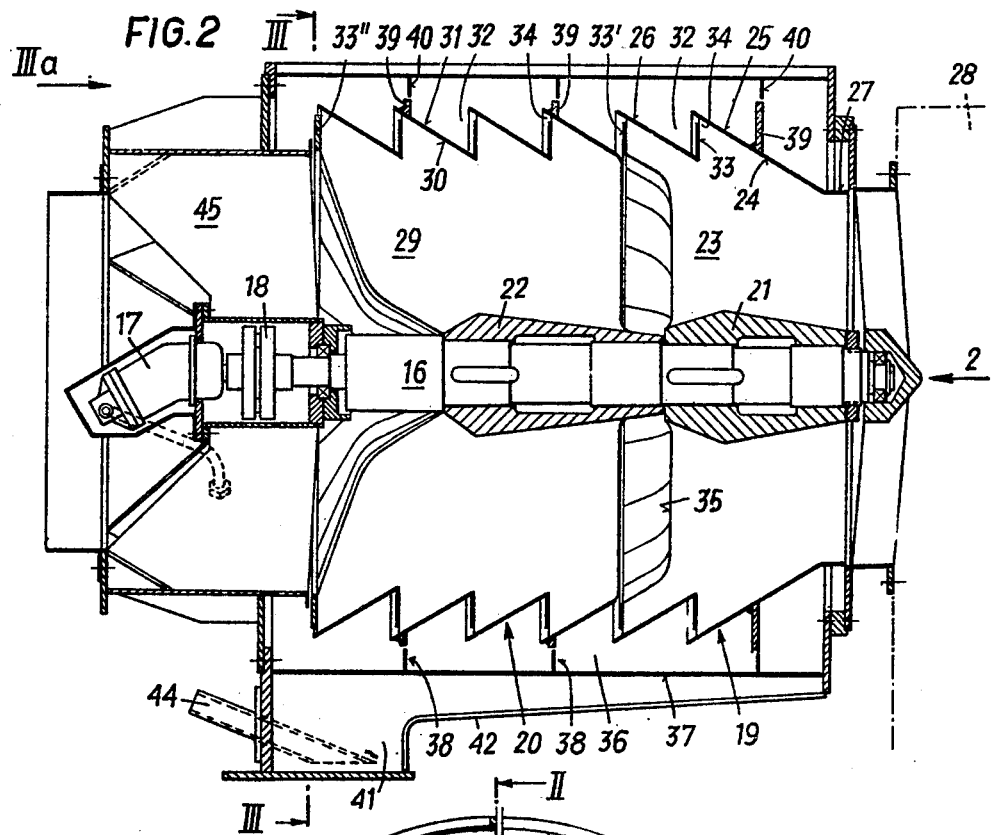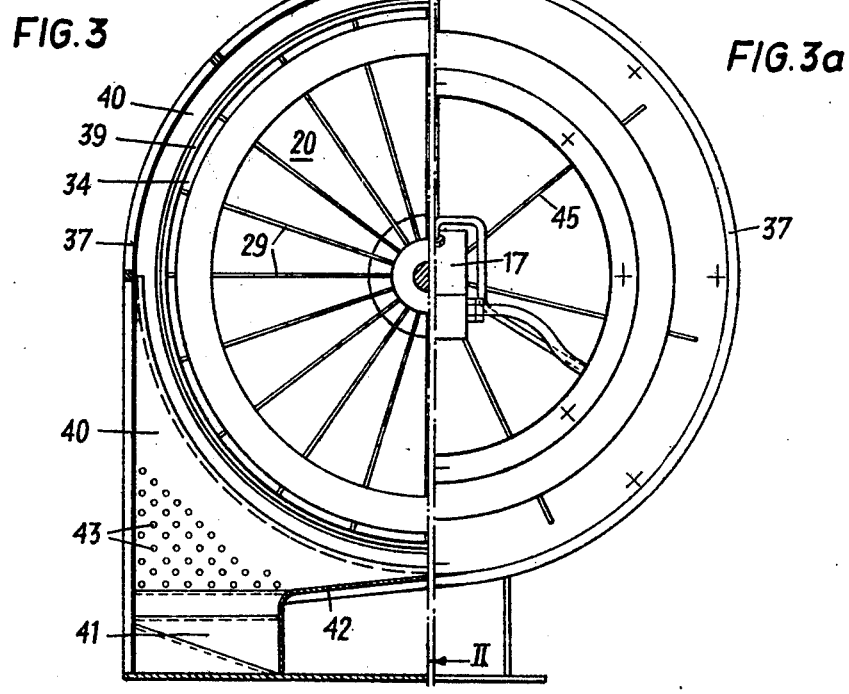

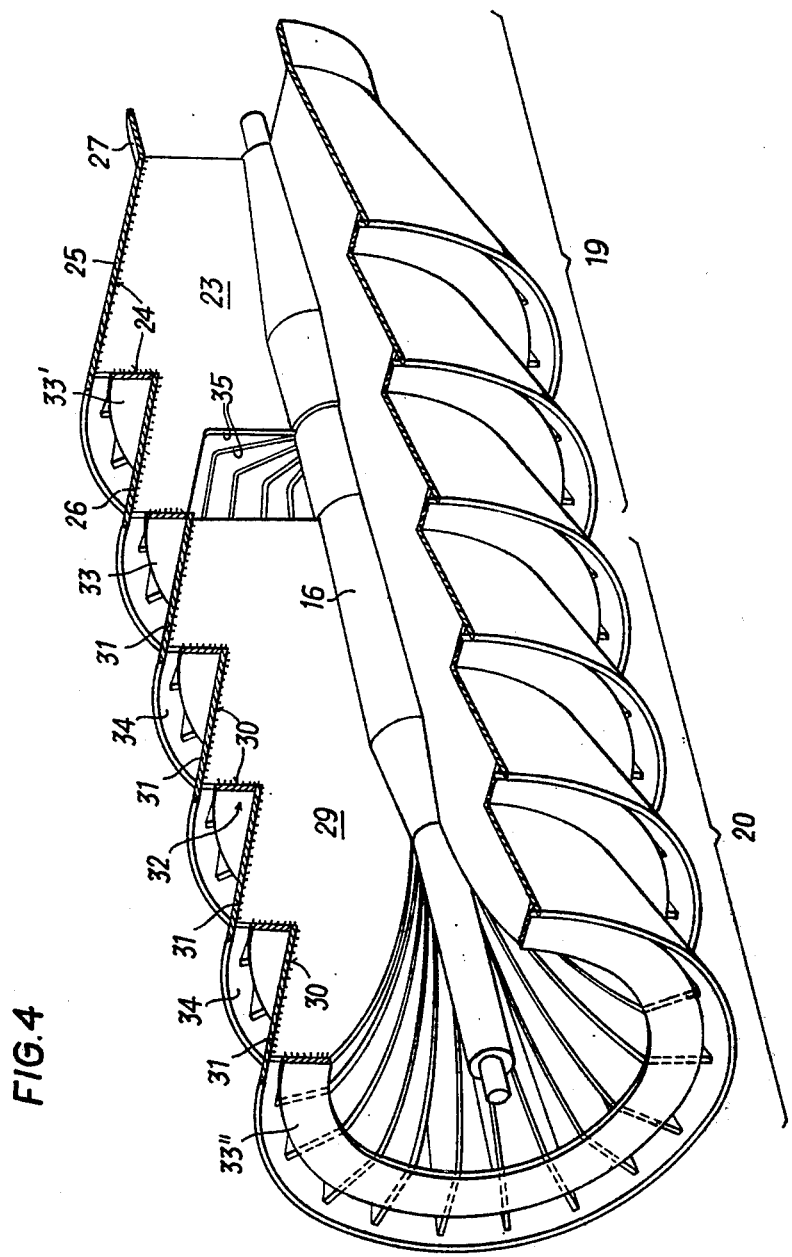

IMPELLER FOR SEPARATING DUST PARTICLES FROM AN AIR STREAM

This invention relates to a device for separating dust particles from an air stream, comprising a centrifugal separator, a blower to convey the air stream through the centrifugal separator, and a device connected before the centrifugal separator in the air flow direction to spray or atomise water which is fed into the air stream entering the centrifugal separator. Such a device is particularly applicable to mine ventilation, where dust deriving from the use of forward thrust machines or other mine working machines has to be led away. Known constructions of these type require a relatively large space, and particularly in the case of mines where the available space is limited, this is a decisive disadvantage. The centrifugal separators used in these known devices are normally in the form of cyclones in which the dust particles combined by means of the water travel to the outside under the action of the centrifugal force deriving from the circular deviation of the air stream, and are there separated. An object of the invention is to improve such a device.

According to the invention there is provided a device for separating dust particles from an air stream, in particular for mine ventilation, comprising a centrifugal separator, a blower for conveying the air stream through the centrifugal separator, and a device connected in advance of the centrifugal separator in the air flow direction to spray or atomise water which is fed into the air stream entering the centrifugal separator, the centrifugal separator being formed from at least one impeller with substantially radial blades connected together at their outer ends by circumferentially extending walls, the distance of which from the axis increases in the air flow direction, passage apertures being provided to the housing at the positions of greatest diameter.

By means of the rotating impeller, on the one hand an effective rotational movement of the air is obtained whereby a centrifugal force is exerted on the dust particles agglomerated by the liquid, and on the other hand the agglomerated dust particles are seized by the rotating blades, and as soon as the dust particles come into contact with the blades they adhere to the blades and are removed by the action of the air stream which is conveyed by the blower axially through the centrifugal separator, so that their outward passage is ensured. As the blades are connected together by walls extending in a circumferential direction, these agglomerated dust particles reach the walls, and as the distance of these walls from the axis increases in the air flow direction, the agglomerated dust particles travel along the walls to the positions where the distance from the axis is greatest, where they are led off through passage apertures into the housing. The agglomerated dust particles are removed in the housing by the action of centrifugal force, however the flow produced by the blower also passes through these walls, and the walls thus prevent any return into the space between the blades. Thus by means of the centrifugal separator constructor according to the invention, an effective separation of the dust particles is made possible, so that that part of the apparatus comprising the centrifugal separator can be made very short, so that the space required for the device is substantially reduced.

According to a preferred embodiment of the invention, several axial rings are disposed stepwise one after the other to form the circumferentially extending walls. This makes it possible for a correspondingly small centrifugal separator diameter to make the angle of inclination of the circumferentially extending walls, i.e. the angle contained by these walls and the axis, correspondingly large so that the conveying of the water agglomerated dust particles along the circumferentially extending walls to the outlet openings is facilitated. In this respect, the arrangement is preferably such that the steps between the individual rings are covered by radially extending annular discs connected to the blades, the inner edge of the discs being tightly connected to the rings and leaving a gap at their outer edge. By means of the radially extending annular discs, the space in the housing external to these walls is substantially separated from the space on the inside of the walls, so that the suction action of the blower is unable to act on the space external to the walls. In this respect it is desirable according to the invention to make the rings overlap the outer edges of the annular discs, so that a drip edge is formed, with removal by the suction action of the blower.

For manufacturing reasons, it is advantageous to make the circumferentially extending walls of the rings conical. Desirably, all these rings are of approximately the same size to give the most satisfactory housing shape. The centrifugal separator may be formed from a single impeller, but according to a preferred embodiment of the invention, two or more impellers series disposed in the axial direction are provided, with a gap between one and the next. The air with the dust particles to be separated is set into rotation by the blades, and the air with the dust particles to be separated is conveyed through the impeller in the axial direction by the action of the blower. Only when the agglomerated dust particles meet the blades and adhere thereto are they drawn away by the suction action of the blower. The rotational speed of the air reduces in the gap between the successive impellers, and the air is again seized by the blades of the next impeller. This thus guarantees that dust particles which did not reach the blade surface in the previous impeller are seized in the subsequent impeller by the blades, so that they are drawn away by the suction action of the blower. In this respect, it is desirable to form the gap by means of recesses in the adjacent ends of the blades, while the ring extends over the width of the gap, so that the separation between the housing space external to the circumferentially extending walls and the space on the inside of these walls is not interrupted. The gap then extends radially only as far as the smallest ring diameter, as the air is seized by the blades of the next impeller only beyond this smallest diameter.

Axially extending fixed guide vanes are desirably provided in the flow direction behind the impeller or behind the last impeller, to again direct the air stream leaving the impeller in an axial direction, as is desirable for its conveying through the blower.

According to the invention, the arrangement is desirably such that the impeller or impellers rotate in a fixed housing and the annular space between the circumferentially extending walls and the fixed housing is divided into individual annular compartments by walls extending approximately perpendicularly to the axis, so as to prevent any axial flow of air in the housing, which would hinder the precipitation of the water agglomerated dust particles. In this respect it is desirable to make at least part of the walls extending perpendicular to the axis in the form of annular discs, rigidly connected to the circumferentially extending walls. In this manner, the walls extending perpendicular to the axis then acts as reinforcements for the circumferentially extending walls of the impeller.

The invention will now be described by way of example with reference to the accompanying drawings wherein;

FIGS. 2 and 3 show a centrifugal separator, FIG. 2b being a longitudinal section on the line II—II of FIG. 3, and FIG. 3 shows a cross-section on the line III—III of FIG. 2.

FIG. 3a is a view in the direction of the arrow IIIa of FIG. 2.

FIG. 4 is a partially cut-away perspective view of the rotor.

Figure 1:
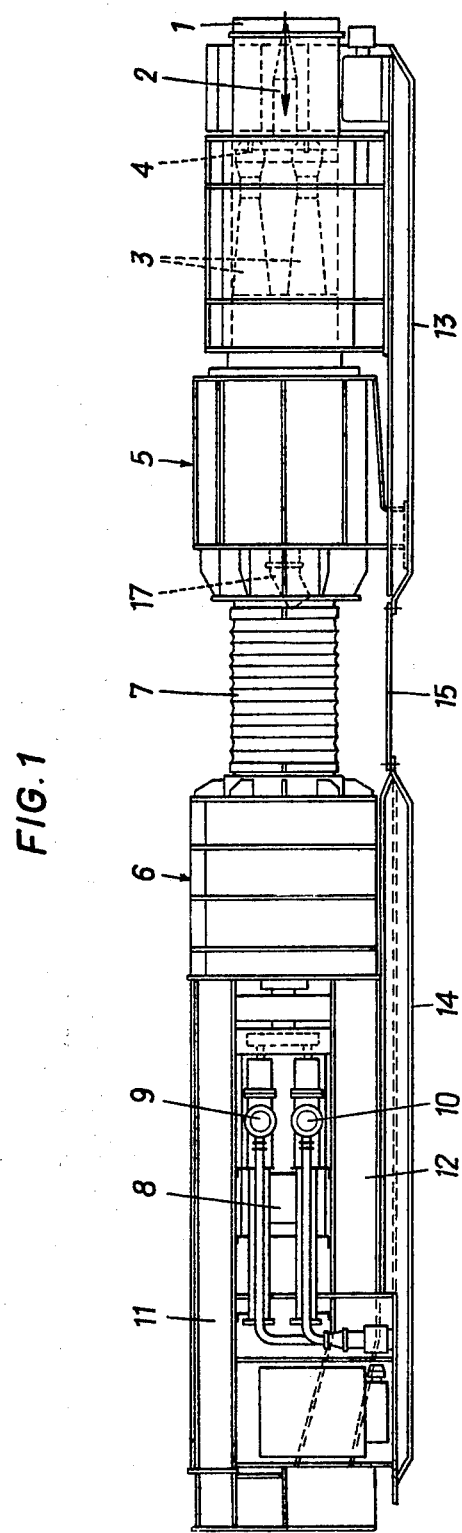
FIG. 1 is a general arrangement of a dust separation device in side view.

The device shown in FIG. 1 has a connection nozzle 1 for an air duct through which air extracted from the locality enters in the direction of the arrow 2. A plurality of venturi tubes 3 traverse in the direction of the arrow 2, water being fed through nozzles 4 and becoming finely divided by impingement with the nozzles 4.

A centrifugal separator 5 is shown to a greater scale in FIGS. 2 and 3. A blower 6 draws in air and conveys it in the direction of the arrow 2. The blower 6 is connected to the centrifugal separator 5 by a bellows 7, having blower drive motor 8. A pump 9 feeds water to the nozzles 4. A pump 10 is provided for withdrawing sludge from the centrifugal separator housing. Ducts 11 and 12 are provided through which the air drawn by the blower 6 flows away. Skids 13 and 14 are hinged together by a bar 15, on which skids the entire device can be slid in an excavation direction in accordance with the progress made in excavation.

FIGS. 2 and 3 show the centrifugal separator. Two impellers 19 and 20 are keyed by hubs 21 and 22 on to a shaft 16 driven by a hydraulic motor 17 via a coupling 18. The blades 23 of the impeller 19 are cut in a saw toothed manner at their outer edge 24. Conical rings 25 and 26 are tightly welded to the outer edge 24 of the blades. The ring 25 extends to a smaller diameter than the ring 26, and comprises a cylindrical appendix 27 which forms the connection for the housing 28 of the venturi tubes 3. The blades 29 of the second impeller 20 are also of saw tooth form at their outer edge 30, and conical rings 31 are tightly welded to this outer edge 30. The conical rings 25, 26 and 31 widen in the air flow direction indicated by the arrow 2. These rings form steps 32, which are closed by annular discs 33 but which leave a gap 34. The annular discs 33 may be welded to the blades 23 or 29, and/or to the rings 26, 31. The last annular disc 33' is welded to the blades 23 of the first impeller 19, and the last annular disc 33" is welded to the blades 29 of the second impeller 20. Recesses 35 in the blades 23 form a gap between the impellers 19 and 20. These recesses 35 extend only as far as the smallest diameter of the next conical ring 31.

On rotation of the impellers 23 and 29, the water agglomerated dust particles are seized and travel centrifugally outwards, to reach the conical rings 25, 26 and 31, and are then conveyed through the gaps 34 into the space 36 in a fixed housing 37. This space 36 is divided in the axial direction by walls 38 perpendicular to the axis of the shaft 16. Some of these walls are in the form of rings 39 welded to the conical rings 25 or 31, to form a reinforcement for the impellers 23, 29. The remaining walls 40 are welded to the fixed housing 37. The fixed housing 37 comprises on one side a downwardly extending pocket 41. A downwardly inclined wall 42 leads to this pocket, and over which the separated particles flow to the pocket 41 in the form of sludge. The walls 40 perpendicular to the axis and dividing the annular space between the housing 37 and impellers 19, 20, are provided in the region of the pocket with perforations 43, to allow equalisation of air pressure between the indidual annular spaces. The sludge is drawn from the pocket 41 through a pipe 44 by the sludge pump 10.

Axially extending fixed guide vanes 45 are connected to the impeller 29 to axially direct the rotating air stream, so as to improve the action of the subsequent blower 6.

What we claim is:

1. A device for separating dust particles from an air stream comprising a centrifugal separator having a rear air outlet end and a forward inlet end for receiving a stream of dust laden air from a blower and means connected in advance of the inlet end of the separator for spraying water into the air stream entering the separator, said separator including a fixed housing and rotatable impeller means within the housing and spaced radially therefrom, said impeller means including a plurality of radial blades having saw-tooth outer edges and a plurality of conical rings arranged in axially spaced relationship with respect to the axis of the impeller means so as to form a plurality of steps, the larger diameter of said rings facing the outlet end of the housing, said rings surrounding said blades and secured along the entire length of the saw-tooth edges thereof so as to form therewith a plurality of radially extending chambers, a plurality of axially-spaced apart annular discs coaxial with the impeller and carried thereby, each of said discs having an outer edge located near the inner surface of a ring in the region of the largest diameter of that ring and forming therewith a gap, each of said discs having an inner edge engaging the outer surface of the next downstream ring in the region of the smallest diameter of that next upstream ring.

2. A device as in claim 1 wherein said rings overlap the outer edges of said annular discs.

3. A device as in claim 1 wherein said rings are of substantially the same size.

4. A device as in claim 1 including axially extending guide vanes located rearwardly of said impeller means.

5. A device as in claim 1 including walls in the space between said impeller means and said housing, said walls lying approximately perpendicular to the axis of said impeller means and dividing said space into individual annular chambers.

6. A device as in claim 5 including a plurality of said walls at least some of which are annular discs rigidly connected to said rings.

7. A device as in claim 5 wherein said housing has a downwardly extending side pocket at its rear end and has a downwardly and rearwardly inclined bottom wall leading into said pocket, said walls which divide the space between the impeller means and the housing into annular chambers being perforated in the region of said pocket.

8. A device as in claim 1 wherein said impeller means includes a forward group of radial blades and a rear group of radial blades, said groups being arranged axially in series with a gap therebetween.

9. A device as in claim 8 wherein said gap between said groups is formed by recesses in the rear ends of the forward group of blades and wherein the rearmost ring of the forward group overlaps said gap.

10. A device as in claim 8 wherein said gap between said groups extends radially only as far as the smallest diameter of the rings.

* * * * *

UNITED STATES PATENT OFFICE
CERTIFICATE OF CORRECTION

Patent No. 4,145,197    Dated March 20, 1979

Inventor(s) Emanuel Strahsner, Peter Kogler and Alfred J. Zitz

It is certified that error appears in the above-identified patent and that said Letters Patent are hereby corrected as shown below:

On the front page format, after paragraph "[22]", insert:  --[30] Foreign Application Priority Data
         May 21, 1976  Austria........A3737/76--

Signed and Sealed this

Twenty-fifth Day of September 1979

[SEAL]

Attest:

LUTRELLE F. PARKER
Attesting Officer    Acting Commissioner of Patents and Trademarks